US 9,287,923 B2

(12) United States Patent
Revol et al.

(10) Patent No.: US 9,287,923 B2
(45) Date of Patent: Mar. 15, 2016

(54) METHOD OF DETECTING INTERFERENCE IN A SATELLITE RADIO-NAVIGATION SIGNAL BASED ON THE MONITORING OF A TEMPORAL CORRELATION COEFFICIENT

(71) Applicant: THALES, Neuilly-sur-Seine (FR)

(72) Inventors: Marc Revol, Upie (FR); David Pietin, Le Haillan (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/526,405

(22) Filed: Oct. 28, 2014

(65) Prior Publication Data
US 2015/0117501 A1    Apr. 30, 2015

(30) Foreign Application Priority Data
Oct. 31, 2013    (FR) ...................................... 13 02522

(51) Int. Cl.
*H04B 1/10*    (2006.01)
*H04B 1/71*    (2011.01)
(Continued)

(52) U.S. Cl.
CPC . *H04B 1/71* (2013.01); *G01S 19/22* (2013.01); *H04B 1/709* (2013.01)

(58) Field of Classification Search
CPC .......... H04B 1/707; H04B 1/69; H04B 1/157; H04B 1/713; H04B 1/7156; H04B 1/709; H04B 1/7093; H04B 1/7117; H04B 1/712; G04B 1/713
USPC .......................... 375/130, 134, 137, 142–143
See application file for complete search history.

(56) References Cited

U.S. PATENT DOCUMENTS 6,038,250 A *    3/2000  Shou et al. ..................... 375/143
6,448,925 B1 *   9/2002  Shridhara ................. 342/357.59
(Continued)

FOREIGN PATENT DOCUMENTS

DE    10 2006 001 794 A1    7/2007
EP    2 520 949 A1    11/2012
FR    2 984 524 A1    6/2013

OTHER PUBLICATIONS

Danai Skournetou et al.; Non-coherent multiple correlator delay structures and their tracking performance for Galileo signals; ENC-GNSS Conference; May-Jun. 2007; Geneva, Switzerland.
(Continued)

*Primary Examiner* — Dac Ha
*Assistant Examiner* — Janice Tieu
(74) *Attorney, Agent, or Firm* — Michael J. Donohue; Davis Wright Tremaine LLP

(57) ABSTRACT

Method of detecting interference in a satellite radio-navigation signal determines the temporal position for which the correlation between the signal and a local spreading code offset by the position is maximum, calculating an information item representative of the intercorrelation between a first measurement of the correlation of the signal with a local spreading code at a first temporal position advanced relative to the temporal position of the maximum by a duration greater than the duration of a slot of the spreading code and a second measurement of the correlation of the signal with a local spreading code at a second temporal position delayed relative to the temporal position of the maximum by a duration greater than the duration of a slot of the spreading code, and comparing the item with a detection threshold configured at least as a function of the ratio of the powers of the signal and of the interference.

13 Claims, 2 Drawing Sheets

(51) Int. Cl.
*H04B 1/709* (2011.01)
*G01S 19/22* (2010.01)

(56) References Cited

U.S. PATENT DOCUMENTS 6,973,119 B2 * 12/2005 Yotsumoto .................... 375/147

8,692,714 B2 * 4/2014 Matsumoto .............. 342/357.77

OTHER PUBLICATIONS

Institute National de la Propriete Industrielle; French Search Report; Jun. 25, 2014; Courbevoie, France.

* cited by examiner

METHOD OF DETECTING INTERFERENCE IN A SATELLITE RADIO-NAVIGATION SIGNAL BASED ON THE MONITORING OF A TEMPORAL CORRELATION COEFFICIENT

FIELD OF THE INVENTION

The present invention relates to the field of satellite radio-navigation systems and more precisely to satellite radio-navigation signals receivers.

The invention pertains to a method of detecting interference in a satellite radio-navigation signal received by such a receiver.

BACKGROUND OF THE INVENTION

When the radio-navigation signal is superimposed on a narrow-band interfering signal, this has the effect of engendering measurement errors which impact the time and position calculations performed by the receiver and ultimately give rise to a positioning error.

It is therefore important to be able to detect the presence of interference in the radio-navigation signal received so as to be able to undertake corrective processing or to exclude the measurements performed in the presence of interference.

The known solutions to the aforementioned problem are based on the detection of an aberrant measurement with respect to an average or an expected deviation.

These solutions exhibit the drawback of requiring too significant a detection time between the instant at which the interference occurs and the instant at which it is actually detected.

The invention proposes a scheme for detecting interference based on the utilization of the intercorrelation between at least two measurements of correlations offset temporally by at least the duration of a slot of the spreading code with respect to the maximum of the correlation function so as to identify the presence of interference for which this intercorrelation exhibits an appreciable value.

The invention can be executed by a satellite-based positioning receiver during the radio-navigation signal tracking phase.

SUMMARY OF THE INVENTION

The subject of the invention is a method of detecting interference in a satellite radio-navigation signal, characterized in that it comprises the following steps:

Determining (201) the temporal position for which the correlation between a local spreading code and the said signal offset by the said position is maximum.

Calculating (202) an item of information representative of the intercorrelation between at least one first measurement of the correlation between the local spreading code and the said signal offset by a first temporal position advanced relative to the temporal position of the said maximum by a duration greater than the duration of a slot of the spreading code and a second measurement of the correlation between the local spreading code and the said offset signal at a second temporal position delayed relative to the temporal position of the said maximum by a duration greater than the duration of a slot of the spreading code.

Comparing (203) the said item of information with a detection threshold configured at least as a function of the ratio of the powers of the signal and of the interference.

According to a particular aspect of the invention, the said item of information is determined by calculating the intercorrelation between the said first measurement and the said second measurement normalized by the sum between the autocorrelation of the said first measurement and the autocorrelation of the said second measurement.

According to a particular aspect of the invention, the time offset between the first temporal position and the temporal position of the said maximum on the one hand and between the second temporal position and the temporal position of the said maximum on the other hand are substantially equal in absolute value.

According to a particular aspect of the invention, the said step of calculating an item of information representative of the intercorrelation is carried out for a number greater than two of measurements of the correlation of the said signal with a local spreading code at a plurality of temporal positions advanced or delayed relative to the temporal position of the said maximum by a duration greater than the duration of a slot of the spreading code.

The subject of the invention is also a device for receiving satellite radio-navigation signals comprising means configured to implement the method of detecting interference according to the invention.

BRIEF DESCRIPTION OF THE DRAWINGS

Other characteristics and advantages of the present invention will be more apparent on reading the description which follows in relation to the appended drawings which represent.

MORE DETAILED DESCRIPTION

Figure 1:
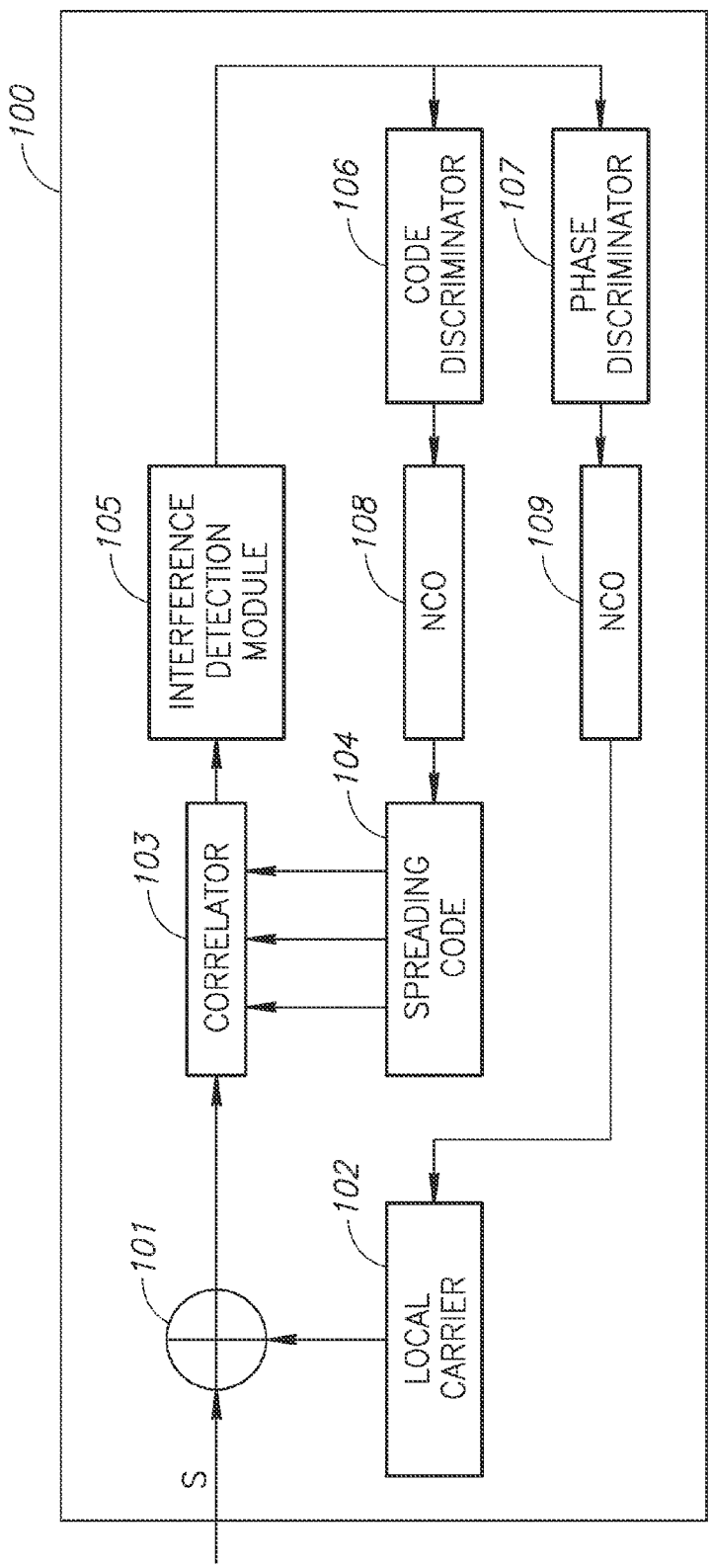
FIG. 1, a schematic of a radio-navigation signals reception device adapted for implementing the method according to the invention, FIG. 2, a flowchart describing the steps for implementing the method of detecting interference according to the invention.

FIG. 1 represents a schematic of a radio-navigation signals reception device adapted for implementing the method according to the invention.

Such a device 100 is based on a standard radio-navigation signals receiver which comprises notably the following functionalities. The received signal S is demodulated in phase by way of a demodulator 101 and of a local carrier 102. The demodulated signal S is thereafter transmitted to a correlator 103 so as to perform a correlation of the signal S with a locally generated spreading code 104. Advantageously, several correlations are carried out with different delays on each occasion. Typically, three correlations can be carried out, one at a given temporal instant, one advanced relative to this instant and the last delayed relative to this same instant, the advance and delay offsets of the received signal being of smaller duration than the duration of a slot of the spreading code, a slot also being called a "chip" according to a well known term of the art.

According to the invention, two additional correlations can be carried out, the first with an advance greater than the duration of a slot of the spreading code, the second with a delay greater than the duration of a slot of the spreading code.

The result of the two additional correlations is provided to a module 105 for detecting interference according to the invention which executes a method described further on in the text.

The device 100 also comprises a code discriminator 106 and a digital control operator NCO 108 for steering the generation of the local code, in particular the temporal instant at which the main correlation is carried out.

The device 100 can also comprise a phase discriminator 107 and a digital control operator NCO 109 for steering the generation of the local carrier 102, stated otherwise the value of the phase shift to be imparted to the received signal S.

The device 100 according to the invention can comprise any other functionality customarily implemented in a satellite radio-navigation signals receiver. The elements described in FIG. 1 can also be replaced with any other equivalent function.

Figure 2:
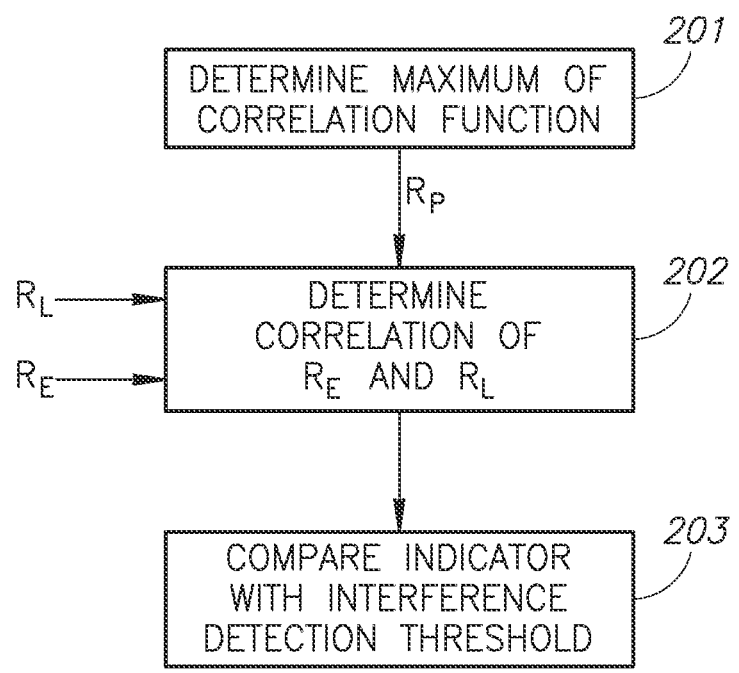

The method according to the invention comprises, as illustrated in the flowchart of FIG. 2, principally three steps.

In a first step 201, the maximum $R_p$ of the correlation function between the locally generated spreading code and the received signal offset temporally by a variable delay is determined on the basis of the correlation results provided by the module 103. The temporal position associated with this correlation maximum which corresponds, in the absence of interference, to the instant at which the received signal and the spreading code are correctly synchronized, is retained. This first step 201 of the method according to the invention is implemented by a radio-navigation signals receiver according to the prior art with the aim of determining a positioning item of information.

In a second step 202, two additional correlation measurements are determined. The first correlation measurement $R_E$ is determined by offsetting the received signal by a positive duration at least equal to the duration of a slot of the spreading code with respect to the temporal position of the maximum $R_P$ of the correlation function. The second correlation measurement $R_L$ is determined by offsetting the received signal by a negative duration at least equal to the duration of a slot of the spreading code with respect to the temporal position of the maximum $R_P$ of the correlation function.

Advantageously the delays applied to calculate the two additional correlation measurements are equal in absolute value but of opposite signs.

In the absence of interference in the frequency band of the radio-navigation signal received, the calculation of correlation between the local spreading code and the received signal with an offset greater than the duration of a slot gives a substantially zero result. Indeed, in such a case, the signal is not correctly synchronized with the local spreading code and their correlation does not produce the expected amplitude spike.

Moreover, two correlation measurements carried out with a time offset greater, in absolute value, than the duration of a slot of the spreading code produce decorrelated results as, being outside of the temporal support of the correlation function, neither the useful signal nor the thermal noise are temporally correlated.

In the presence of an interfering signal on the contrary, these two correlation measurements exhibit a non-zero inter-correlation since the frequency of the interfering signal is a priori different from that of the satellite radio-navigation signal.

By measuring the level of intercorrelation between the two correlators calculated in step 202, it is possible to deduce therefrom an indicator of the presence of interference.

Accordingly, an item of information representative of the intercorrelation between the measurements $R_E$ and $R_L$ is therefore calculated.

This item of information can be obtained with the aid of the following relation, where the operator * designates the complex conjugate operator:

$$\gamma = \frac{\sum_{k=0}^{K} R_E(kT) \cdot R_L^*(kT)}{\sum_{k=0}^{K} R_E(kT) \cdot R_E^*(kT) + \sum_{k=0}^{K} R_L(kT) \cdot R_L^*(kT)}$$

The normalization of the intercorrelation by the sum of the energies of the two correlation measurements makes it possible to obtain an indicator of stable value.

When no interfering signal is present in the useful band of the received signal, the intercorrelation and therefore the interference indicator exhibits a low value.

On the contrary, when an interfering signal is present in the useful band, and whatever its power, the interference indicator exhibits a higher value, stabilized on account of the energy-based normalization.

In a third step 203, the indicator $\gamma$ is compared with an interference detection threshold $S_{DET}$ configured as a function of the ratio of the powers of the useful signal and of the interfering signal. If the indicator $\gamma$ is greater than the detection threshold $S_{DET}$ then the presence of interference is concluded.

Variant embodiments of the method according to the invention comprise notably the use of a number N greater than two of correlation measurements, at temporal positions offset by at least the duration of a slot with respect to the temporal position of the correlation maximum.

In this case, the intercorrelation between two correlation measurements is replaced by an N-dimensional calculation of intercorrelation between N correlation measurements.

In the various alternative embodiments of the device 100 according to the invention, the calculation modules can be arranged according to various architectures, in particular each step of the method according to the invention can be implemented by a distinct module or on the contrary the two steps can be grouped together within a unique calculation module.

Each of the calculation modules constituting the device according to the invention can be embodied in software and/or hardware form. Each module can notably consist of a processor and a memory. The processor can be a generic processor, a specific processor, an Application Specific Integrated Circuit (ASIC) or a Field-Programmable Gate Array (FPGA).

The invention claimed is:

1. Method, implemented by a radio-navigation signals receiver comprising a correlator and an interference detector, for detecting interference in a received satellite radio-navigation signal, comprising the steps of:
    determining, at the correlator, a temporal position for which a correlation between a local spreading code and said received signal shifted by said position is maximum;
    calculating, at the correlator, a first measurement of a correlation between said local spreading code and said received signal shifted by a first temporal position advanced relative to the temporal position of said maximum by a first duration greater than a duration of a slot of the spreading code;
    calculating, at the correlator, a second measurement of a correlation between said local spreading code and said received signal shifted by a second temporal position delayed relative to the temporal position of the said maximum by a second duration greater than a duration of the slot of the spreading code;

calculating, at the interference detector, an item of information representative of an intercorrelation between at least said first measurement and said second measurement; and comparing, at the interference detector, the said item of information with a detection threshold configured at least as a function of a ratio of powers of the signal and of the interference, and producing, from said comparison, an information on the presence or absence of interference in the received satellite radio-navigation signal.

2. Method for detecting interference according to claim 1, in which the said item of information is determined by calculating, at the interference detector, the intercorrelation between the said first measurement and the said second measurement, normalized by a sum between an autocorrelation of the said first measurement and an autocorrelation of the said second measurement.

3. Method for detecting interference according to claim 1, in which a time offset between the first temporal position and the temporal position of the said maximum is substantially equal in absolute value to a time offset between the second temporal position and the temporal position of the said maximum.

4. Method for detecting interference according to claim 1, comprising the steps of:

calculating, at the correlator, a plurality of measurements of the correlation of the said signal with the local spreading code at a plurality of temporal positions advanced or delayed relative to the temporal position of the said maximum by a third duration greater than the duration of the slot of the spreading code; and calculating, at the interference detector, an item of information representative of an intercorrelation between said plurality of measurements of the correlation.

5. Method for detecting interference according to claim 1, further comprising a step of receiving, at the radio-navigation signals receiver, a satellite radio-navigation signal.

6. Method for detecting interference according to claim 1, further comprising a step of undertaking corrective processing to the satellite radio navigation signal when a presence of interference in the received satellite radio-navigation signal is detected.

7. Method for detecting interference according to claim 1, further comprising a step of excluding a measurement performed on a received satellite radio-navigation signal when a presence of interference in the received satellite radio-navigation signal is detected.

8. A device for receiving satellite radio-navigation signals comprising:

a correlator configured to:
determine a temporal position for which a correlation between a local spreading code and said signal shifted by said position is maximum;
calculate a first measurement of a correlation between the local spreading code and the said signal shifted by a first temporal position advanced relative to the temporal position of the said maximum by a first duration greater than a duration of a slot of the spreading code; and
calculate a second measurement of a correlation between the local spreading code and the said signal shifted by a second temporal position delayed relative to the temporal position of the said maximum by a second duration greater than a duration of the slot of the spreading code; and an interference detector configured to:
calculate an item of information representative of an intercorrelation between at least said first measurement and said second measurement; and
compare the said item of information with a detection threshold configured at least as a function of a ratio of powers of the signal and of the interference, and producing, from said comparison, an information on the presence of absence or interference in the received satellite radio-navigation signal.

9. The device for receiving satellite radio-navigation signals according to claim 8, in which the interference detector is configured to determine the said item of information by calculating the intercorrelation between the said first measurement and the said second measurement normalized by a sum between an autocorrelation of the said first measurement and an autocorrelation of the said second measurement.

10. The device for receiving satellite radio-navigation signals according to claim 8, in which a time offset between the first temporal position and the temporal position of the said maximum is substantially equal in absolute value to a time offset between the second temporal position and the temporal position of the said maximum.

11. The device for receiving satellite radio-navigation signals according to claim 8, in which:

the correlator is configured to calculate a plurality of measurements of the correlation of the said signal with the local spreading code at a plurality of temporal positions advanced or delayed relative to the temporal position of the said maximum by a third duration greater than the duration of the slot of the spreading code; and the interference detector is configured to calculate an item of information representative of an intercorrelation between said plurality of measurements of the correlation.

12. The device for receiving satellite radio-navigation signals according to claim 8, said device being further configured to undertake corrective processing to the satellite radio navigation signal when a presence of interference in the received satellite radio-navigation signal is detected.

13. The device for receiving satellite radio-navigation signals according to claim 8, said device being further configured to exclude a measurement performed on a received satellite radio-navigation signal when a presence of interference in the received satellite radio-navigation signal is detected.

* * * * *